United States Patent
Schlegel et al.

(10) Patent No.: US 11,159,535 B2
(45) Date of Patent: Oct. 26, 2021

(54) METHODS FOR CONTROLLING A DEVICE AND CONTROL SYSTEM

(71) Applicant: ABB Schweiz AG, Baden (CH)

(72) Inventors: Roman Schlegel, Wettingen (CH); Thomas Locher, Zurich (CH)

(73) Assignee: ABB Schweiz AG, Baden (CH)

( * ) Notice: Subject to any disclaimer, the term of this patent is extended or adjusted under 35 U.S.C. 154(b) by 158 days.

(21) Appl. No.: 16/161,207

(22) Filed: Oct. 16, 2018

(65) Prior Publication Data
US 2019/0116189 A1  Apr. 18, 2019

(30) Foreign Application Priority Data
Oct. 18, 2017 (EP) .................................... 17196988

(51) Int. Cl.
H04L 29/06 (2006.01)
H04L 12/927 (2013.01)
H04L 29/08 (2006.01)

(52) U.S. Cl.
CPC .......... H04L 63/105 (2013.01); H04L 47/805 (2013.01); H04L 63/102 (2013.01); (Continued)

(58) Field of Classification Search
CPC ... H04L 63/105; H04L 67/125; H04L 63/102; H04L 67/025
See application file for complete search history.

(56) References Cited

U.S. PATENT DOCUMENTS

| | | | |
|---|---|---|---|
| 2004/0117624 A1* | 6/2004 | Brandt | H04L 69/329 713/166 |
| 2008/0209213 A1 | 8/2008 | Astrand et al. | |

(Continued)

FOREIGN PATENT DOCUMENTS

| | | |
|---|---|---|
| CN | 101606370 A | 12/2009 |
| CN | 105871854 A | 8/2016 |

(Continued)

OTHER PUBLICATIONS

European Patent Office, Extended Search Report & Written Opinion issued in corresponding Application No. 17196988.4, dated Mar. 29, 2018, 10 pp.

(Continued)

*Primary Examiner* — Ellen Tran
(74) *Attorney, Agent, or Firm* — Greenberg Traurig, LLP (57) ABSTRACT

A method for controlling a device includes: sending a command signed by an operator's signature to a server; verifying, in the server, that the operator is authenticated to transmit the command; assigning, in the server, a criticality level and an authorization level to the command; depending on the criticality level and the authorization level, sending an approval request relating to the command to at least one control user; approving or denying the approval request by at least a subset of the at least one control user; sending the denied or approved approval request back to the server; determining, in the server, whether the command was approved by sufficiently many control users based on the criticality level and the authorization level; and sending the command to the device for being carried out by the device in case the command was approved by sufficiently many control users, wherein at last one of the at least one control user and the operator is remote from each other.

20 Claims, 5 Drawing Sheets

(52) U.S. Cl.
CPC .......... *H04L 63/104* (2013.01); *H04L 67/125* (2013.01); *H04L 63/08* (2013.01); *H04L 63/20* (2013.01)

(56) References Cited

U.S. PATENT DOCUMENTS

| | | | |
|---|---|---|---|
| 2011/0230991 A1* | 9/2011 | Case | H04L 9/3231 700/95 |
| 2012/0317132 A1 | 12/2012 | Brady et al. | |
| 2017/0041322 A1* | 2/2017 | Kurian | H04L 63/102 |

FOREIGN PATENT DOCUMENTS

| | | |
|---|---|---|
| EP | 2290900 A1 | 3/2011 |
| FR | 2910206 A1 | 6/2008 |

OTHER PUBLICATIONS

The Patent Office of the People's Republic of China, First Office Action issued in corresponding Chinese application No. 201811214500.X, dated Dec. 28, 2020, 29 pp.

\* cited by examiner

METHODS FOR CONTROLLING A DEVICE AND CONTROL SYSTEM

Aspects of the invention relate to methods for controlling a device, and in particular to methods for controlling a device with interaction of at least one remote entity. Further aspects relate to a control system, in particular a control system being configured to carry out methods for controlling a device.

TECHNICAL BACKGROUND

Systems for controlling a device are known. Also system for remotely controlling a device are known. In current systems where devices can be remotely controlled (e.g., changes of configuration, initiating actions, etc.), there is often a single person responsible for initiating these changes and actions, without any additional oversight. Some of these actions can be eminently critical, e.g., in the extreme case an incorrect configuration change or action could damage equipment or endanger lives. Until now this has not been a big issue as there are relatively few devices that are remotely controlled in this way. However, with more and more devices being remotely controlled (e.g., through IoT, etc.), ensuring the security and safety of commands being sent to remotely controlled devices becomes important.

Thus, there is a need for methods for controlling a device and a control system that overcome at least a part of these problems.

SUMMARY OF THE INVENTION

In view of the above, methods for controlling a device according to claims 1 and 2, and a control system to claim 12 are provided.

According to an aspect, a method for controlling a device is provided. The method includes: sending a command signed by an operator's signature to a server; verifying, in the server, that the operator is authenticated to transmit the command; assigning, in the server, a criticality level and an authorization level to the command; depending on the criticality level and the authorization level, sending an approval request relating to the command to at least one control user; approving or denying the approval request by at least a subset of the at least one control user; sending the denied or approved approval request back to the server; determining, in the server, whether the command was approved by sufficiently many control users based on the criticality level and the authorization level; and sending the command to the device for being carried out by the device in case the command was approved by sufficiently many control users. At last one of the at least one control user and the operator is remote from each other.

According to a further aspect, a method for controlling a device is provided. The method includes: sending a command signed by an operator's signature to a server; verifying, in the server, that the operator is authenticated to transmit the command; sending the command to the device for being carried out by the device; assigning, in the server, a criticality level and an authorization level to the command; depending on the criticality level and the authorization level, sending an approval request relating to the command to at least one control user; and further carrying out the command in case the device does not receive a stop command to stop execution of the command. At last one of the at least one control user and the operator is remote from each other.

According to a further aspect, a method for controlling a device is provided. The method includes: sending a command signed by an operator's signature to a server; verifying, in the server, that the operator is authenticated to transmit the command; sending the command to the device for being carried out by the device; assigning, in the server, a criticality level and an authorization level to the command; depending on the criticality level and the authorization level, sending an approval request relating to the command to at least one control user; approving or denying the approval request by at least a subset of the at least one control user; sending the denied or approved approval request back to the server; determining, in the server, whether the command was approved by sufficiently many control users based on the criticality level and the authorization level; and sending a roll-back command to the device in case the command was not approved by sufficiently many control users. At last one of the at least one control user and the operator is remote from each other.

According to a further aspect, a control system is provided. The control system includes: a device; at least one control interface; and a server. The server is configured to receive a command signed by an operator's signature, verify that the operator is authenticated to transmit the command, assign a criticality level and an authorization level to the command, and depending on the criticality level and the authorization level, send an approval request relating to the command to the at least one control interface. The at least one control interface is configured to let the approval request be approved or denied by the at least one control user, and send the denied or approved approval request back to the server. The server is further configured to determine whether the command was approved by sufficiently many control users based on the criticality level and the authorization level, and send the command to the device for being carried out by the device. At least one of the device, the server and the at least one control interface is remote from each other.

With the methods for controlling a device and/or the control system, which may be applied to devices in which the responsibility of the operator is increased, it can be ensured that commands that are sent to the device are appropriate. In particular, it can be ensured by imposing an approval workflow for commands. Accordingly, devices can be protected from inadvertent mistakes as well as from insider attacks (e.g., disgruntled employees). Further, a criticality level can be assigned to commands, and the approval workflow or method can be tailored to the criticality level, whereby the impact of the process can be minimized.

Further advantages, features, aspects and details that can be combined with embodiments described herein are evident from the dependent claims, the description and the drawings.

BRIEF DESCRIPTION OF THE FIGURES

The details will be described in the following with reference to the figures, wherein.

DETAILED DESCRIPTION OF THE FIGURES AND OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment applies to a corresponding part or aspect in another embodiment as well.

Embodiments described herein can apply an approval process to remote control operations. In particular, it can be ensured that all commands sent to remotely controlled devices have been screened and approved through a defined process, specifically to ensure that only secure and safe instructions are executed on remotely controlled devices. Further, the approval process can be tailored to a criticality level of the command being issued. For example, inconsequential commands may be associated with a less strict approval than commands that could have far-reaching consequences.

Figure 1:
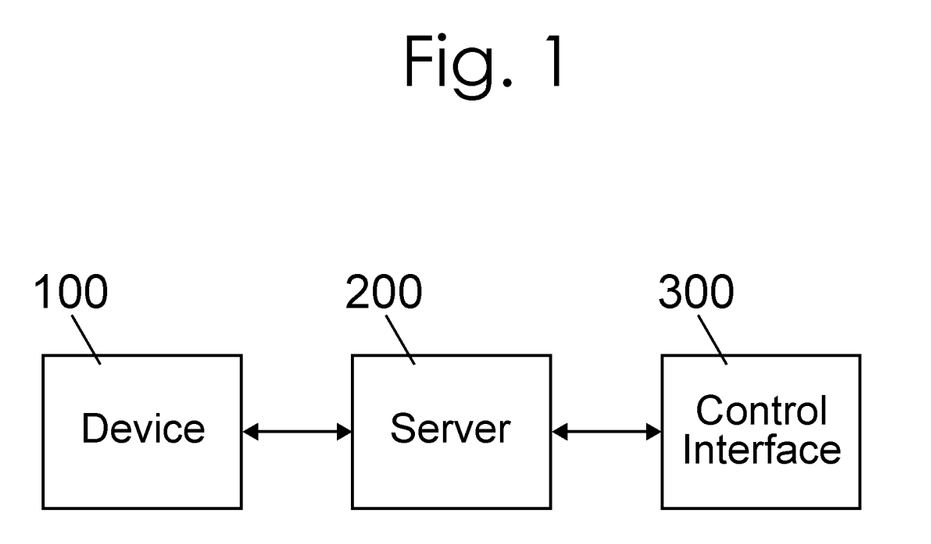
FIG. 1 is a schematic view of a control system according to embodiments.

FIG. 1 shows a schematic view of a control system. The control system can include a device 100, at least one control interface 300, and/or a server 200. At least one of the device 100, the server 200 and the at least one control interface 300 can be remote from each other. The device 100 can be a stationary or mobile device. Specifically, the device can be an asset, such as vessels, or any fixed asset, such as a device in automation systems, etc. In particular, the device can be a device able to perform a physical task. Further, the device 100 can include an actuator for moving the device 100 and/or changing a direction of travel of the device 100.

The device 100, the at least one control interface 300, and/or the server 200 can be configured for establishing a communicative link to at least another one of the device 100, the at least one control interface 300, and/or the server 200 in order to communicate with at least another one of the device 100, the at least one control interface 300, and/or the server 200. For instance, the server 200 can be configured to communicate with the device 100 and the at least one control interface 300. Further, the server 200 can be a secured access control server.

The server 200 can be configured to receive a command signed by an operator's signature. The server 200 can receive the command from a system component that can be remote from the server. For example, the system component can be a part of the device 100 or can be remote from the device 100. The system component can issue the command on its own, i.e. by an automatic process, or on behalf of an operator who manually issues the command. The command can be signed using the operator's signature. If the command is issued automatically, the command can be signed with the signature of the operator operating the system component.

The server 200 can be configured to verify that the operator is authenticated to transmit the command. That is, the server 200 can verify whether the operator signing the command is authenticated to issue the command or not. Specifically, the operator's signature can be used for verifying that the operator is authenticated to transmit the command.

The server 200 can be configured to assign a criticality level and/or an authorization level to the command. In the context of the present application "criticality level", such as the criticality level assignable to the command, can be a valued tied to approval constraints. For instance, the criticality level can state how many control user must approve the command prior to execution. According to embodiments described herein, the critically level can set an amount of control user that must approve the command before it can be executed. Likewise, in the context of the present application, an "authorization level", such as the authorization level assignable to the command, can be a valued tied to approval constraints. For instance, the authorization level can state which role the control user must have for being authenticated to approve the command.

According to embodiments described herein, the criticality level can be determined and/or changed statically and/or dynamically. In particular, a static definition of the criticality level of each command can be compiled manually and/or with a tool that automates this process based on a given rule set. For instance, any command that affects some critical component of the device can automatically be assigned a high criticality level. A dynamic change to the criticality levels can include changing the configuration of a running device manually by a control user and/or operator with sufficient access rights. Dynamic changes can also occur automatically, e.g. different configurations may be applied at different times such as day/night, weekday/weekend and so on. According to embodiments, determining and/or changing the criticality level dynamically is a based on a machine learning approach.

The server 200 can be configured to send an approval request relating to the command to the at least one control interface 300. The server 200 can be configured to send the approval request depending on the criticality level and the authorization level. That is, the approval request can be send if the criticality level of the command indicates that an approval by at least one control user is required. Further, the approval request can be sent to at least one control user that is authenticated to approve the approval request. According to embodiments described herein, the approval request can be sent only to control users that are authenticated to deny and/or approve the approval request.

For instance, if a very low criticality level is assigned to the command, no approval of the command may be required. That is, only commands at a certain criticality level must be approved by at least on control user. Further, the approval request can be send to more or even many more control users than needed so that the command can be send to the device 100 as soon as sufficiently many approved approval requests are received. When practicing embodiments, the approval process can be speed up and/or process slow-down can be minimized.

Further, the approval request can be sent together with the signed command. Furthermore, the approval request can be signed. Additionally or alternatively, the server 200 can be configured to sign the approval request and/or the command with the server's signature. According to embodiments, it can be indicated who issued to command and/or which server distributes the command.

The at least one control interface 300 can be configured to let the approval request be approved or denied by at least one control user. Specifically, the control interface 300 can be configured to prompt a control user to approve or deny the approval request. The at least one control interface 300 can be configured to send the denied or approved approval request back to the server 200.

Although the at least one control user can approve or deny the approval request, the at least one control user must not be forced to react on the approval request. For instance, the at least one control user can ignore the approval request. In such a situation, not approved approval requests will be sent back to the server 100.

In cases where a high or even very high criticality level is assigned to the command, the at least one control user can be forced to respond to the approval request, i.e. to approve or deny the approval request. For instance, the at least one control interface 300 can be configured to interrupt processing and/or postpone any other tasks until the at least one control user has approved or denied the approval request. According to embodiments, the approval request relating to the command can be sent to the at least one control user along with an interruption command interrupting an ongoing process on a control interface 300 of the control user until the approval request is approved or denied. Additionally or alternatively, the criticality level can determine that the at least one control interface 300 interrupts processing and/or postpone any other tasks until the at least one control user has approved or denied the approval request. When practicing embodiments, the approval process can be speed up and/or process slow-down can be minimized.

The server 200 can be configured to determine whether the command was approved by sufficiently many control users based on the criticality level and the authorization level. Specifically, the server 100 can be configured to determine whether sufficiently many control users having the appropriate role have approved the approval request. For instance, some control users that do not have the appropriate role may have approved the approval request, but these approvals are not taken into account. According to embodiments described herein, the server 200 can be configured to verify whether the denied or approved approval request is sent by a control user who is authenticated to deny and/or approve the approval request. According to embodiments described herein, determining whether the command was approved by sufficiently many control users includes comparing the amount and/or authorization level of denied and/or approved approval requests to a threshold. The threshold can depend on the criticality level.

Further, the server 200 can include a timer that can be configured to count to a predetermined time limit. If the time limit lapses without receiving sufficiently many approved approval requests, the server 100 can be configured to send a time-out indicator to the system component initiating the command and/or the device 100 indicating that not sufficiently many control users having the appropriate role have approved the approval request within the time limit. In such a case, the device will not carry out the command. However, the system component initiating the command can resend the command along with a request to at least temporally change the criticality level and/or the authentication level of the command. Accordingly, fewer approvals may be required and/or the at least one control user can be forced to respond to the approval request.

The server 200 can be configured to send the command to the device 100 for being carried out by the device 100. Specifically, the server 200 can be configured to send the command to the device 100 for being carried out by the device 100 if sufficiently many control users having the appropriate role have approved the approval request, i.e. if sufficiently many approved approval requests have been received by the server, specifically within the time limit.

After receiving the command, the device 100 can carry out the command. Specifically, the command may perform a certain task given by the command. For instance, in case of the device being a vessel, the command can instruct the vessel to perform a certain maneuver, such as turn left. The command may be issued by an operator on the device 100, such as a captain or pilot, or may be issued by an operator remote from the device 100. Furthermore, the command may trigger a maintenance task or a release.

According to embodiments described herein, the device 100 can be configured to send a reply message indicating that the command is or was carried out. The reply message can be sent to the server 200, which may forward the reply message to the at least one control users and/or the system component issuing the command. For instance, the server 200 can be configured to forward the reply message to those control users who have responded to, specifically approved, the approval request. Furthermore, the server 200 can be configured to send an "approval successful" message to the system component issuing the command in case the command was approved by sufficiently many control users. Additionally or alternatively, the server 200 can be configured to send an "approval failed" message to the system component issuing the command in case the command was not approved by sufficiently many control users and/or when the time limit elapsed before receiving sufficiently many approvals.

While any of operations, tasks and/or processes described herein can be carried out in any logical order, at least the operations of sending the command and sending the approval request are carried out sequentially.

According to embodiments described herein, the at least one of the device 100, the server 200 and the at least one control interface 300 may include a network interface for connecting the device to a data network, in particular a global data network. The data network may be a TCP/IP network such as the Internet. The at least one of the device 100, server 200 and the at least one control interface 300 can be operatively connected to the network interface for carrying out commands received from the data network. The commands may include a control command for controlling the device to carry out a task such as moving the device 100 and/or changing a direction of travel of the device 100. In this case, the device 100 can be adapted for carrying out the task in response to the control command. The commands may include a status request. In response to the status request, or without prior status request, the at least one of the device 100, server 200 and the at least one control interface 300 may be adapted for sending a status information to the network interface, and the network interface is then adapted for sending the status information over the network. The commands may include an update command including update data. In this case, the at least one of the device 100, server 200 and the at least one control interface 300 can be adapted for initiating an update in response to the update command and using the update data.

The data network may be an Ethernet network using TCP/IP such as LAN, WAN or Internet. The data network may include distributed storage units such as a Cloud. Depending on the application, the Cloud can be in form of public, private, hybrid or community Cloud.

The network interface can be configured to transceive digital signal/data between the at least one of the device 100, server 200 and the at least one control interface 300 and the data network, wherein the digital signal/data include operational command and/or information about the device or the network. Specifically, the network interface and/or the data network can be used for establishing the communicative link between at least one of the device 100, server 200 and the at least one control interface 300 and at least another one of the device 100, the at least one control interface 300, and/or the server 200.

Figure 2:
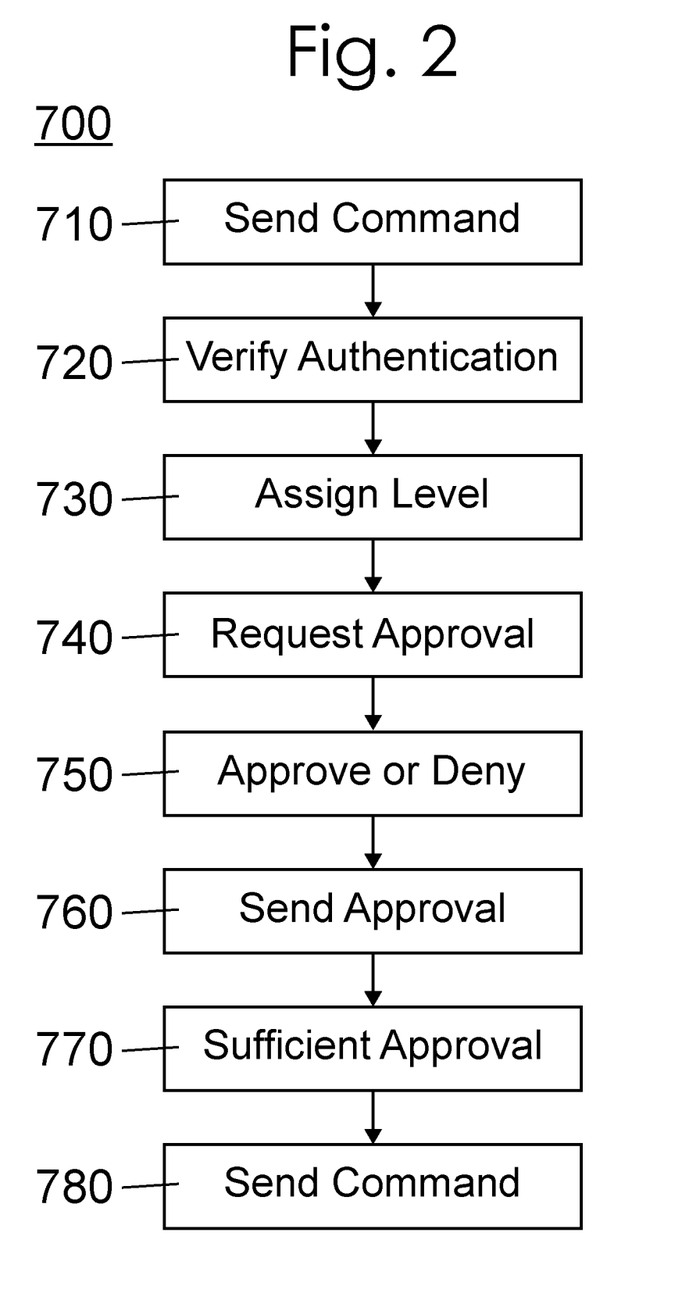
FIG. 2 is a flow diagram of a method for controlling a device according to embodiments.

FIG. 2 shows a flow diagram of a method 700 for controlling a device 100. The method can include at least one of blocks 710 to 780. In block 710, command signed by an operator's signature can be sent to a server 200. In block 720, it can be verified, in the server 200, that the operator is authenticated to transmit the command. In block 730, a criticality level and/or an authorization level can be assigned to the command. In block 740, an approval request relating to the command can be sent, depending on the criticality level and/or the authorization level, to at least one control user. In block 750, the approval request can be approved or denied by at least a subset of the at least one control user. In block 760, the denied or approved approval request can be sent back to the server 200. In block 770, it can be determined, in the server 200, whether the command was approved by sufficiently many control users based on the criticality level and the authorization level. In block 780, the command can be sent to the device 100 for being carried out by the device 100 in case the command was approved by sufficiently many control users. At last one of the at least one control user and the operator can be remote from each other.

The present disclosure can be an enabler for a sophisticated control of devices, such as controlled vessels, drones, but also fixed installations, specifically where the security and safety of control is envisaged. When practicing embodiments, the risks associated with controlling a device with interaction of at least one remote entity can be reduced. When practicing embodiments the control of a device with remote interaction can be secured.

Figure 3:
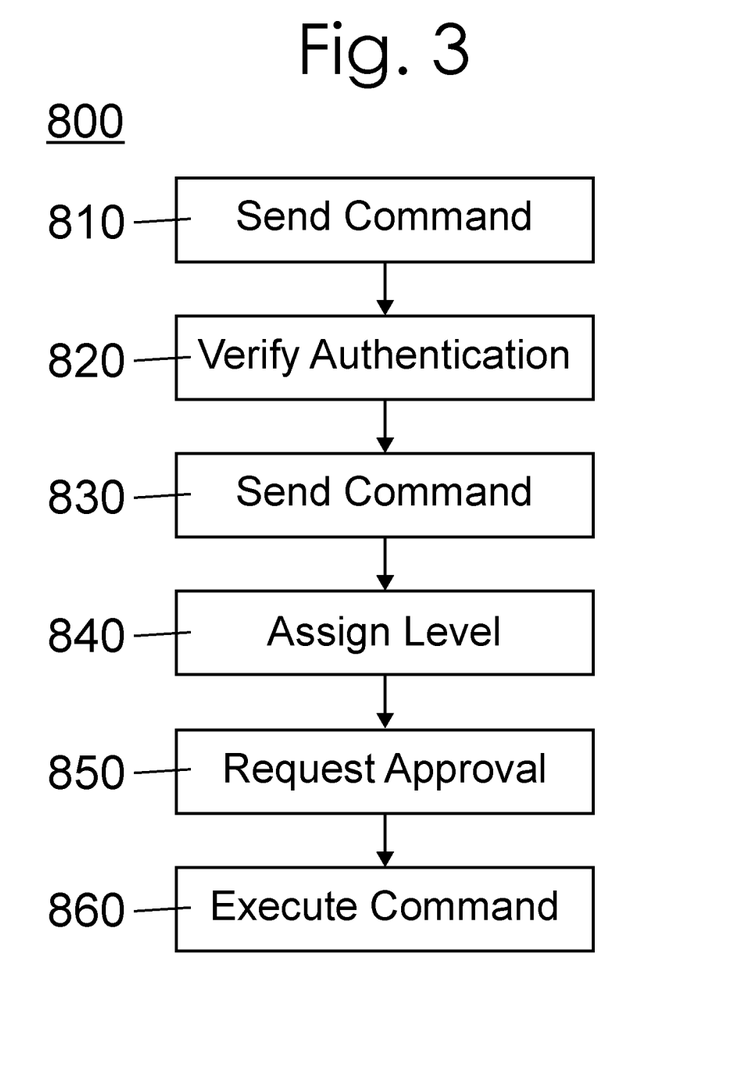
FIG. 3 is a flow diagram of a method for controlling a device according to embodiments.

FIG. 3 shows a flow diagram of a method 800 for controlling a device 100. The method can include at least one of blocks 810 to 860. In block 810, a command signed by an operator's signature can be sent to a server 200. In block 820, it can be verified, in the server 200, that the operator is authenticated to transmit the command. In block 830, the command can be sent to the device 100 for being carried out by the device 100. In block 840, a criticality level and/or an authorization level can be assigned to the command. In block 850, an approval request relating to the command can be sent, depending on the criticality level and/or the authorization level, to at least one control user. In block 860, the command can be further carried out in case the device 100 does not receive a stop command to stop execution of the command. At last one of the at least one control user and the operator can be remote from each other.

Specifically, the server 200 can be configured to send a stop command to the device 100. For instance, the stop command can be sent if not sufficiently many control users approve the approval requests and/or if the server 200 receives a predetermined amount of denied approval requests. When receiving the stop command, the device 100 can stop to carry out the command.

The method 800 can particularly be applied to commands that have a low criticality level. Specifically, the method 800 can be applied to commands when carried out do not lead to an irreversible action.

Figure 4:
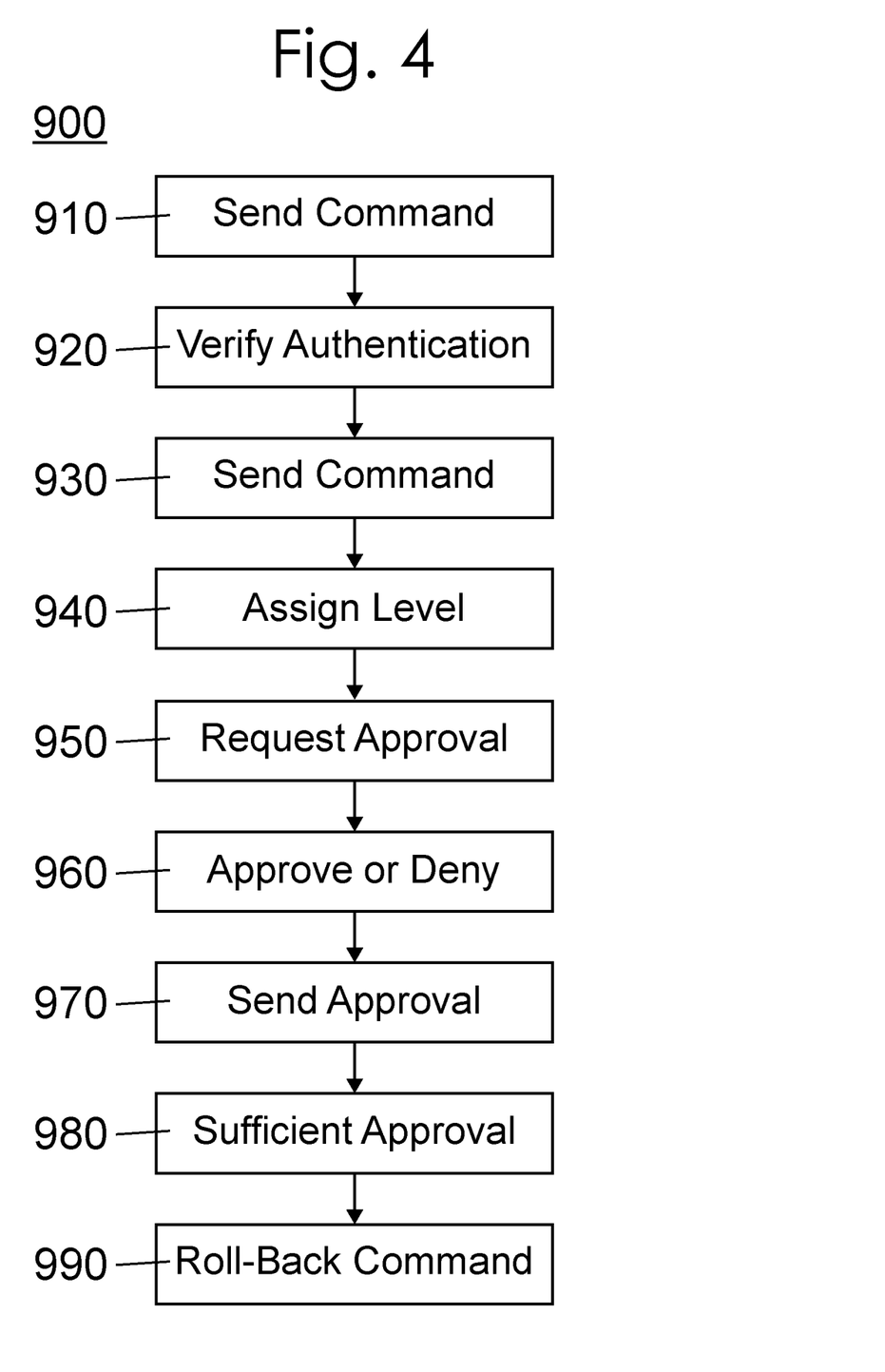
FIG. 4 is a flow diagram of a method for controlling a device according to embodiments.

FIG. 4 shows a flow diagram of a method 900 for controlling a device 100. The method can include at least one of blocks 910 to 990. In block 910, command signed by an operator's signature can be sent to a server 200. In block 920, it can be verified, in the server 200, that the operator is authenticated to transmit the command. In block 930, the command can be sent to the device 100 for being carried out by the device 100. In block 940, a criticality level and/or an authorization level can be assigned to the command. In block 950, an approval request relating to the command can be sent, depending on the criticality level and/or the authorization level, to at least one control user. In block 960, the approval request can be approved or denied by at least a subset of the at least one control user. In block 970, the denied or approved approval request can be sent back to the server. In block 980, it can be determined, in the server 200, whether the command was approved by sufficiently many control users based on the criticality level and/or the authorization level. In block 990, a roll-back command can be sent to the device 100 in case the command was not approved by sufficiently many control users. At last one of the at least one control user and the operator is remote from each other.

The method 800 can be specifically applied to commands that can be easily reversed and/or whose impact can be easily corrected. In such a case, the device 100 can be configured to roll-back the command carried out by the device 100. For instance, if a vessel carries out a command to turn e.g. left, leading to a change of course, the vessel can change its course again to the original course upon receipt of the roll-back command. When practicing embodiments, an optimistic execution with a potential roll-back is possible.

The control system described herein can be configured to carry out any one of the methods 700, 800, 900. Specifically, the control system can be configured to carry out the methods 700, 800, 900 depending on the command. That is, depending on the command that is received by the control system, the control system can carry out one of methods 700, 800, 900, and enabling a secure control of the device with the respective one of methods 700, 800, 900.

Figure 5:
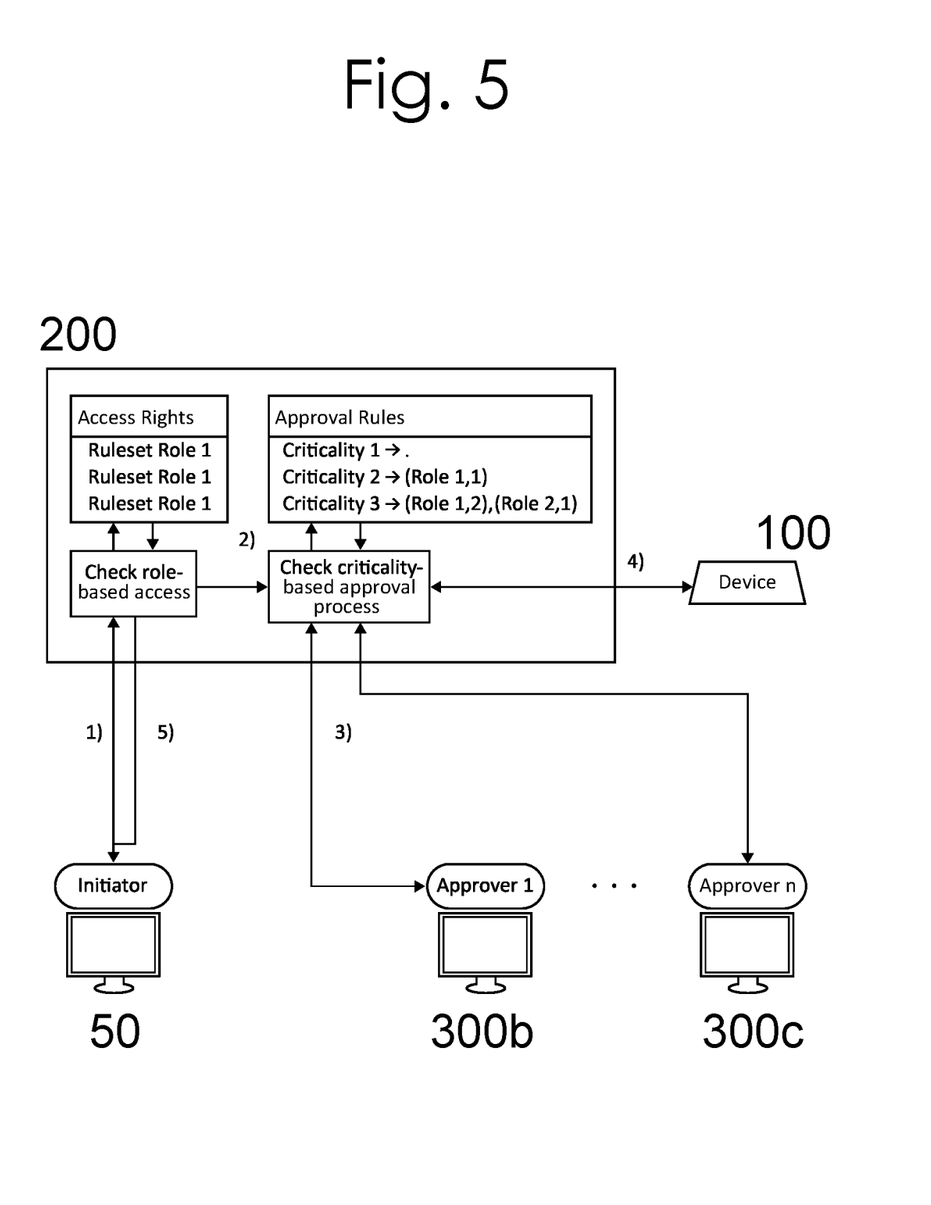
FIG. 5 is a schematic view of a control system according to embodiments.

FIG. 5 is a schematic view of an exemplary control system, explaining an exemplary method.

As shown in FIG. 5, a system component 50 can initiate a command. The system component 50 can issue the command on its own, i.e. by an automatic process, or on behalf of an operator who manually issues the command. The command can be signed using the operator's signature. If the command is issued automatically, the command can be signed with the signature of the operator operating the system component. This signed command can be forwarded to server 200, specifically a secured access control (AC) server (see 1) in FIG. 5).

The server first can verify that the operator has a role that allows it to execute this type of command, i.e., that the operator is authenticated to transmit the command. If this verification is successful, the server 200 can determines the command's criticality level and/or an authorization level, which can be defined for all commands (either statically, or potentially also dynamically using machine learning or other algorithms). The criticality level and/or authorization level can be tied to approval constraints, stating how many other actors with certain roles must approve the command prior to execution (see 2) in FIG. 5).

The server 200 then can send the signed approval request, e.g. together with the signed command to at least sufficiently many control interfaces 300a, 300b of control users for approval (see 3) in FIG. 5).

Each control user receiving such an approval request is prompted to accept or deny it and the response is sent back to the server 200.

If the server 200 receives (at least) as many approvals from each role as required, it will sign the command itself and forward it to the device 100, which potentially responds with a reply after executing the command (see 4) in FIG. 5).

The server 200 can then inform the system component where the command originated from about the successful execution (step 5).

If the operator does not have the rights to execute the command in the first place, or sufficiently many approvals could not be gathered (e.g., because approval was denied, or the approval process timed out), then the server 200 informs the operator that the command could not be executed.

In the example of FIG. 5, there are three roles and criticality levels. The first criticality level does not require any approvals (i.e., it is only verified that the operator is authenticated to transmit the command). The second criticality level requires (at least) one approval from a control user having role 1. The third criticality level requires (at least) two approvals from control users having role 1 and additionally one approval from a control user having role 2.

While the foregoing is directed to embodiments of the disclosure, other and further embodiments of the disclosure may be devised without departing from the basic scope thereof, and the scope thereof is determined by the claims that follow.

The invention claimed is:

1. A method for controlling a device, the method comprising:
   sending a command signed by an operator's signature to a server;
   verifying, in the server, that the operator is authenticated to transmit the command;
   assigning, in the server, a criticality level and an authorization level to the command, wherein the criticality level specifies an amount of at least one control user that must approve the command before the command can be executed, and the authorization level specifies the role the at least one control user must have for approving the command;
   depending on the criticality level and the authorization level, sending an approval request relating to the command to the at least one control user;
   approving or denying the approval request by at least a subset of the at least one control user;
   sending the denied or approved approval request back to the server;
   determining, in the server, whether the command was approved by sufficiently many control users based on the criticality level and the authorization level; and
   sending the command to the device for being carried out by the device in case the command was approved by sufficiently many control users,
   wherein at last one of the at least one control user and the operator is remote from each other, and
   wherein determining whether the command was approved by sufficiently many control users includes comparing the amount and authorization level of denied and approved approval requests to determine if the specified amount of control users having the specified authorization level have approved the approval request; and
   wherein a time-out indicator is sent if the specified amount of control users having the specified authorization level have not approved the approval request within a time limit.

2. The method according to claim 1, wherein the device is a moveable device.

3. The method according to claim 1, wherein criticality level is at least one selected from the group consisting of determined statically and changed statically.

4. The method according to claim 1, wherein the approval request is sent only to control users that are authenticated to do at least one selected from the group consisting denying and approving the approval request.

5. The method according to claim 1, further comprising:
   verifying whether the denied or approved approval request is sent by a control user who is authenticated to do at least one selected from the group consisting of denying and approving the approval request.

6. The method according to claim 1, wherein the approval request relating to the command is sent to the at least one control user along with an interruption command interrupting an ongoing process on a control interface of the control user until the approval request is approved or denied.

7. The method according to claim 1, wherein at least the operations of sending the command and sending the approval request are carried out sequentially.

8. The method according to claim 1, wherein criticality level is at least one selected from the group consisting of determined dynamically and changed dynamically.

9. The method according to claim 8, wherein determining the criticality level dynamically is a based on a machine learning approach.

10. A method for controlling a device, the method comprising:
    sending a command signed by an operator's signature to a server;
    verifying, in the server, that the operator is authenticated to transmit the command;
    sending the command to the device for being carried out by the device;
    assigning, in the server, a criticality level and an authorization level to the command, wherein the criticality level specifies an amount of at least one control user that must approve the command before the command can be executed, and the authorization level specifies the role the at least one control user must have for approving the command;
    depending on the criticality level and the authorization level, sending an approval request relating to the command to the at least one control user; and
    further carrying out the command in the case the device does not receive a stop command to stop execution of the command,
    wherein at last one of the at least one control user and the operator is remote from each other, and
    wherein determining whether the command was approved by sufficiently many control users includes comparing the amount and authorization level of denied and approved approval requests to determine if the specified amount of control users having the specified authorization level have approved the approval request; and
    wherein a time-out indicator is sent if the specified amount of control users having the specified authorization level have not approved the approval request within a time limit.

11. The method according to claim 10, wherein the device is a moveable device.

12. The method according to claim 10, wherein criticality level is at least one selected from the group consisting of determined statically and changed statically.

13. The method according to claim 10, wherein criticality level is at least one selected from the group consisting of determined dynamically and changed dynamically.

14. A method for controlling a device, the method comprising:

sending a command signed by an operator's signature to a server;

verifying, in the server, that the operator is authenticated to transmit the command;

sending the command to the device for being carried out by the device;

assigning, in the server, a criticality level and an authorization level to the command, wherein the criticality level specifies an amount of at least one control user that must approve the command before the command can be executed, and the authorization level specifies the role the at least one control user must have for approving the command;

depending on the criticality level and the authorization level, sending an approval request relating to the command to the at least one control user;

approving or denying the approval request by at least a subset of the at least one control user;

sending the denied or approved approval request back to the server;

determining, in the server, whether the command was approved by sufficiently many control users based on the criticality level and the authorization level; and sending a roll-back command to the device in case the command was not approved by sufficiently many control users, wherein at last one of the at least one control user and the operator is remote from each other, and wherein determining whether the command was approved by sufficiently many control users includes comparing the amount and authorization level of denied and approved approval requests to determine if the specified amount of control users having the specified authorization level have approved the approval request; and wherein a time-out indicator is sent if the specified amount of control users having the specified authorization level have not approved the approval request within a time limit.

15. The method according to claim 14, wherein the device is a moveable device.

16. The method according to claim 14, wherein criticality level is at least one selected from the group consisting of determined statically and changed statically.

17. A control system, comprising:

a device;

at least one control interface; and a server, wherein the server is configured to:

receive a command signed by an operator's signature, verify that the operator is authenticated to transmit the command, assign a criticality level and an authorization level to the command, wherein the criticality level specifies an amount of at least one control user that must approve the command before the command can be executed, and the authorization level specifies the role the at least one control user must have for approving the command, and depending on the criticality level and the authorization level, send an approval request relating to the command to the at least one control interface, wherein the at least one control interface is configured to:

let the approval request be approved or denied by the at least one control user, and send the denied or approved approval request back to the server, and wherein the server is further configured to:

determine whether the command was approved by sufficiently many control users based on the criticality level and the authorization level, and send the command to the device for being carried out by the device, wherein at least one of the device, the server and the at least one control interface is remote from each other, wherein determining whether the command was approved by sufficiently many control users includes comparing the amount and authorization level of denied and approved approval requests to determine if the specified amount of control users having the specified authorization level have approved the approval request; and wherein a time-out indicator is sent if the specified amount of control users having the specified authorization level have not approved the approval request within a time limit.

18. The control system of claim 17, wherein the device is configured to roll-back the command carried out by the device.

19. The control system of claim 17, wherein the device is a stationary or mobile device.

20. The control system of claim 17, wherein at least one of the device, the server and the at least one control interface comprise a network interface for connecting the at least one of the device, server and the at least one control interface to a data network.

* * * * *